US009234667B2

(12) United States Patent
Ito et al.

(10) Patent No.: US 9,234,667 B2
(45) Date of Patent: Jan. 12, 2016

(54) DEHUMIDIFYING SYSTEM

(75) Inventors: Shinichi Ito, Tokyo (JP); Masaki Toyoshima, Tokyo (JP); Fumitake Unezaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 81 days.

(21) Appl. No.: 13/885,706

(22) PCT Filed: Jan. 18, 2011

(86) PCT No.: PCT/JP2011/000211
§ 371 (c)(1),
(2), (4) Date: May 16, 2013

(87) PCT Pub. No.: WO2012/073386
PCT Pub. Date: Jun. 7, 2012

(65) Prior Publication Data
US 2013/0239814 A1 Sep. 19, 2013

(30) Foreign Application Priority Data

Dec. 2, 2010 (JP) ................ 2010-269280

(51) Int. Cl.
*B01D 53/26* (2006.01)
*F24F 3/14* (2006.01)
*F24F 6/04* (2006.01)

(52) U.S. Cl.
CPC .............. *F24F 6/04* (2013.01); *B01D 53/261* (2013.01); *F24F 3/1429* (2013.01); *B01D 2257/80* (2013.01); *B01D 2259/4508* (2013.01)

(58) Field of Classification Search
CPC .. B01D 53/04; B01D 53/261; B01D 2257/80; B01D 2259/458; F24F 3/1429; F24F 3/14; F24F 6/04; F24F 11/02
USPC .......... 95/10, 11; 96/111, 121, 126, 116, 131; 62/515, 92, 94; 236/44 A
See application file for complete search history.

(56) References Cited

U.S. PATENT DOCUMENTS 3,359,706 A * 12/1967 Zankey ..................... 95/18
4,040,804 A *  8/1977 Harrison ................... 96/118
(Continued)

FOREIGN PATENT DOCUMENTS

| CH | 691 349 A5 | 7/2001 |
| JP | 48-20993 B1 | 6/1973 |

(Continued)

OTHER PUBLICATIONS

Machine generated English translation of JP 07-185248 A, published Jul. 1995.*

(Continued)

*Primary Examiner* — Frank Lawrence
(74) *Attorney, Agent, or Firm* — Posz Law Group, PLC

(57) ABSTRACT

An air passage that connects an inlet port that sucks air from a dehumidification target space and an outlet port that supplies air to the dehumidification target space; a heating device that heats the air; a first moisture adsorption/desorption device releasing moisture into air that has a relatively low humidity and absorbing moisture from air that has a relatively high humidity; a second moisture adsorption/desorption device disposed so as to be spaced apart from the first moisture adsorption/desorption device, a cooling device cooling air that has been humidified; and switching devices switching between an air path passing air through the first moisture adsorption/desorption device, the cooling device, and the second moisture adsorption/desorption device in this order, and an air path in which the air passes through the second moisture adsorption/desorption device, the cooling device, and the first moisture adsorption/desorption device in this order.

15 Claims, 8 Drawing Sheets

(56) References Cited

U.S. PATENT DOCUMENTS

| | | | |
|---|---|---|---|
| 4,719,761 A | | 1/1988 | Cromer |
| 5,768,897 A * | | 6/1998 | Rainville et al. ............... 62/94 |
| 6,581,297 B1 * | | 6/2003 | Ginder ............................. 34/79 |
| 7,887,770 B2 * | | 2/2011 | Suzuki et al. ............. 423/328.1 |
| 8,865,020 B2 * | | 10/2014 | Suzuki et al. ................ 252/194 |
| 2008/0083336 A1 * | | 4/2008 | Tschantz ....................... 96/118 |
| 2010/0107656 A1 * | | 5/2010 | Nakaguro et al. ............. 62/3.4 |
| 2013/0213079 A1 * | | 8/2013 | Ito et al. ..................... 62/324.6 |
| 2014/0157806 A1 * | | 6/2014 | Ito et al. ......................... 62/92 |

FOREIGN PATENT DOCUMENTS

| | | |
|---|---|---|
| JP | 07-185248 A | 7/1995 |
| JP | 2005-034838 A | 2/2005 |
| JP | 2007-240128 A | 9/2007 |
| WO | WO 2009/084632 A1 * | 7/2009 |

OTHER PUBLICATIONS

Office Action mailed Jun. 25, 2014 issued in corresponding CN patent application No. 2011800578105 (and English translation).
Office Action mailed Jul. 1, 2014 issued in corresponding JP patent application No. 2012-546652 (and English translation).
Keiichi Inukai et al., "Shinki Koseino Kyuchakuzai dearu Aluminum Keisan'en no Suijoki Oyobi Tans an Gas Kyuchaku Tokusei", Proceedings of Fall Meeting of the Ceramic Society of Japan, Dai 22 Kai, The Ceramic Society of Japan, Sep. 16, 2009, p. 408, lower part, lecture No. 2P33.
International Search Report of the International Searching Authority mailed Mar. 29, 2011 for the corresponding international application No. PCT/JP2011/000211 (with English translation).
Office Action mailed Mar. 24, 2015 issued in corresponding JP patent application No. 2012-546652 (and English translation).
Office Action mailed Mar. 4, 2015 issued in corresponding CN patent application No. 201180057810.5 (and English translation).

* cited by examiner (a)

(b)

(a)

(b)

F I G. 7
(a)
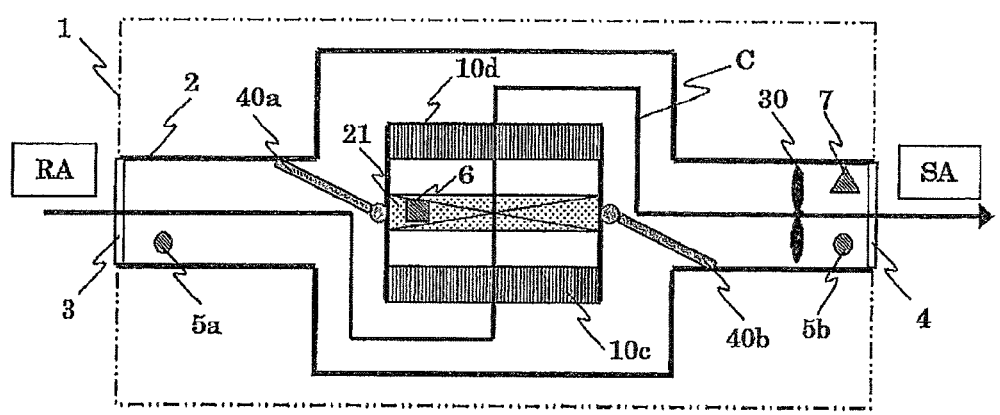
(b)
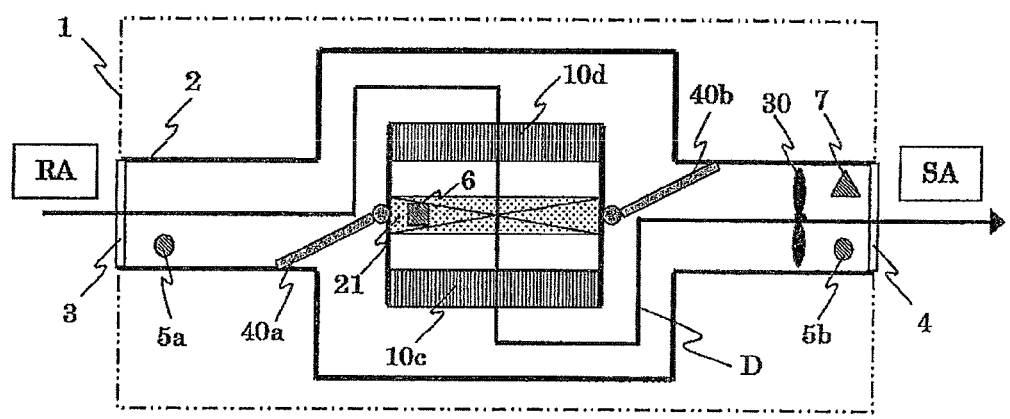

DEHUMIDIFYING SYSTEM

CROSS REFERENCE TO RELATED APPLICATIONS

This application is a U.S. national stage application of PCT/JP2011/000211 filed on Jan. 18, 2011, and claims priority to, and incorporates by reference, Japanese Patent Application No. 2010-269280 filed on Dec. 2, 2010.

TECHNICAL FIELD

The present invention relates to a dehumidifying system that controls indoor humidity by circulating indoor air such as air in a living space and by carrying out dehumidification with a desiccant that adsorbs moisture included in the air.

BACKGROUND ART

In the related art, a dehumidifying system has been proposed in which a rotating desiccant rotor supported by an adsorbent that carries out adsorption and desorption of moisture is used, and in which a heat exchanger of a heat pump is used as a regenerative heat source of a desorption portion of this desiccant rotor. This dehumidifying system is configured to carry out a continuous dehumidifying operation by disposing a desiccant rotor in an air passage through which air of a dehumidification target space circulates and by making the desiccant rotor rotate, and, further, by passing air through heating means serving as a regenerative heat source, the desorption portion of the desiccant rotor, cooling means, and an absorption portion of the desiccant rotor in this order (see Patent Literature 1, for example).

CITATION LIST

Patent Literature

Patent Literature 1: Japanese Unexamined Patent Application Publication No. 2005-34838 (claim 1, FIG. 1)

SUMMARY OF INVENTION

Technical Problem

In the dehumidifying system of the Patent Literature 1 described above, the air passage is separated into an adsorption side and a desorption side, the desiccant rotor is disposed so as to astride the two air passages, and the desiccant rotor is made to rotationally move between an adsorption region and a desorption region alternately; hence, a sliding surface occurs in a rotating shaft of the desiccant rotor. Since frictional resistance occurs on this sliding surface, durability of the desiccant rotor is decreased due to wear of the rotating shaft leading to increase in the number of repairs and parts replacement.

Furthermore, sealing characteristics of the sliding surface need to be taken into consideration. If the sealing characteristics of the sliding surface drop due to continuous operation, there will be an air leakage between the two air passages leading to drop in dehumidifying capacity without the adsorbent carrying out sufficient adsorption and desorption. Additionally, since frictional resistance occurs on the sliding surface, input for driving the desiccant rotor becomes high.

The invention is addressed to overcome the above described problems and, by using moisture adsorption/desorption devices in which no sliding surface occurs, provide a dehumidifying system that is capable of improving the durability of the devices and reduce expendable parts, as well as efficiently carrying out a continuous dehumidifying operation.

Solution to Problem

A dehumidifying system according to the invention includes a main body that includes an inlet port that sucks air from a dehumidification target space and an outlet port that supplies air to the dehumidification target space; an air passage provided in the main body, the air passage connecting the inlet port and the outlet port; a heating device that is disposed in the air passage, the heating device heating the air sucked from the inlet port; a first moisture adsorption/desorption device disposed on a downstream side of the heating device, the first moisture adsorption/desorption device releasing moisture into air that has a relatively low humidity and absorbing moisture from air that has a relatively high humidity; a second moisture adsorption/desorption device disposed on a downstream side of the heating device and disposed so as to be spaced apart from the first moisture adsorption/desorption device, the second moisture adsorption/desorption device releasing moisture into air that has a relatively low humidity and absorbing moisture from air that has a relatively high humidity; a cooling device disposed between the first moisture adsorption/desorption device and the second moisture adsorption/desorption device, the cooling device cooling air that has been humidified by release of moisture from the first moisture adsorption/desorption device or the second moisture adsorption/desorption device; and switching devices disposed in the air passage, the switching devices switching between a first path in which the air sucked from the inlet port through the heating device, the first moisture adsorption/desorption device, the cooling device, and the second moisture adsorption/desorption device in this order, and a second path in which the air sucked from the inlet port through the heating device, the second moisture adsorption/desorption device, the cooling device, and the first moisture adsorption/desorption device in this order.

Advantageous Effects of Invention

According to the invention, the switching devices provided in the air passage switch between the air path that passes the air of the dehumidification target space through the heating device, the first moisture adsorption/desorption device, the cooling device, and the second moisture adsorption/desorption device in this order and that supplies humidity-controlled air to the dehumidification target space, and the air path that passes the air of the dehumidification target space through the heating device, the second moisture adsorption/desorption device, the cooling device, and the first moisture adsorption/desorption device in this order and that supplies humidity-controlled air to the dehumidification target space. The moisture adsorption/desorption devices in which no sliding surface occur are employed to allow a dehumidifying operation be carried out continuously. Furthermore, since no sliding surface occurs in the moisture adsorption/desorption devices, the durability of the moisture adsorption/desorption devices is improved and the number of repairs and expendable parts can be reduced.

BRIEF DESCRIPTION OF DRAWINGS

FIG. 7 is a schematic configuration diagram of a dehumidifying system according to a third embodiment of the invention.

DESCRIPTION OF EMBODIMENTS

First Embodiment

Figure 1:
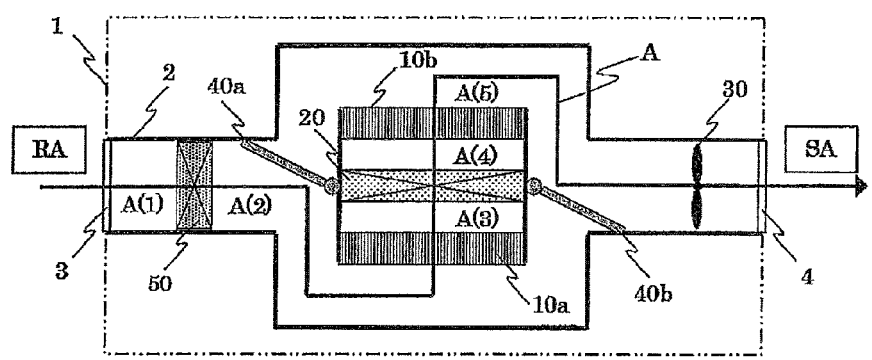
FIG. 1 is a schematic configuration diagram illustrating a dehumidifying system according to a first embodiment of the invention.
Figure 1:
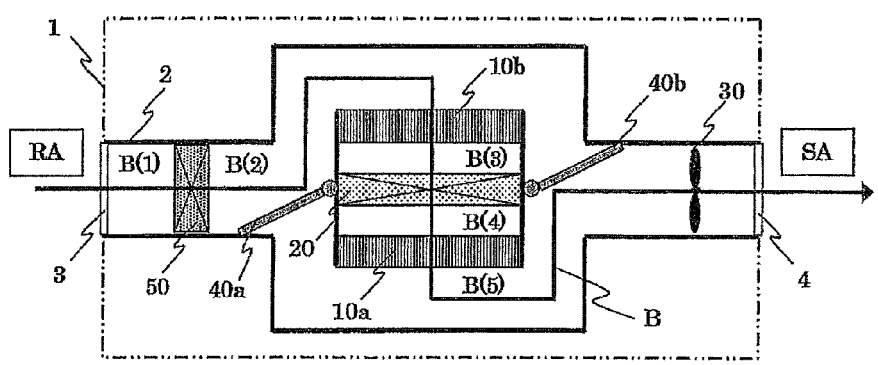

FIG. 1 is a schematic configuration diagram of a dehumidifying system according to a first embodiment of the invention when seen from above.

As illustrated in FIG. 1, the dehumidifying system according to the first embodiment is provided with a main body 1 including an inlet port 3 that sucks indoor air (RA) from an indoor space, which is a dehumidification target space, and an outlet port 4 that supplies humidity-controlled air (SA) to the indoor space, and an air passage 2 through which air flows and that connects the inlet port 3 and the outlet port 4. The air passage 2 includes therein a heating device 50 that heats air, moisture adsorption/desorption devices 10a and 10b that adsorb moisture included in the air or desorb moisture into the air, a cooling device 20 that cools air, an air sending device 30 that blows air inside the air passage 2, and switching devices 40a and 40b that switch between paths of the air that is flowing in the air passage 2.

In FIG. 1, reference characters A and B each denote a path of the air flowing in the air passage 2. FIG. 1(a) is a sucking of an air path A, FIG. 1(b) is that of an air path B. The air path A is a path in which indoor air is sucked from the inlet port 3, passes through the heating device 50, the moisture adsorption/desorption device 10a, the cooling device 20, and the moisture adsorption/desorption device 10b, passes through the air sending device 30, and is supplied into the indoor space as humidity-controlled air. The air path B is a path in which indoor air is sucked from the inlet port 3, passes through the heating device 50, the moisture adsorption/desorption device 10b, the cooling device 20, and the moisture adsorption/desorption device 10a, passes through the air sending device 30, and is supplied into the indoor space as humidity-controlled air.

The air path A and the air path B are configured so that they can be switched by the switching devices 40a and 40b after elapse of every predetermined time duration. The switching devices 40a and 40b employ a dumper or the like and, although not shown, carries out switching of the air path by controlling the rotation operation of a motor that is used for the dumper operation. The timing of the motor rotation operation is set to take place at a predetermined time interval.

The air passage 2 is structured such that a pipeline connecting the inlet port 3 and the outlet port 4 is bifurcated midway into two directions. The switching device 40a is disposed in a portion where this bifurcation starts, and the switching device 40b is disposed in a portion where the bifurcation ends. The moisture adsorption/desorption device 10a, the cooling device 20, and the moisture adsorption/desorption device 10b are disposed between the switching device 40a and the switching device 40b, and are disposed in a direction substantially perpendicular to the flow direction of the air flowing from the inlet port 3 towards the outlet port 4. By structuring the air passage 2 In this way, it is possible to configure two air paths in a single air passage 2 with the switching operation of the switching devices 40a and 40b alone without the need for a complex pipeline structure.

In order to obtain a large cross-sectional area in which the air passes, the moisture adsorption/desorption devices 10a and 10b each include porous flat plates having pores each with a polygonal section along the cross section of the pipeline in the portion where the moisture adsorption/desorption devices 10a and 10b of the air passage 2 is disposed. The pores are structured such that air can pass through in the thickness direction of the porous flat plate. Furthermore, since the moisture adsorption/desorption devices 10a and 10b in the air passage 2 are structurally disposed as described above, when the cross-sectional area in which the air passes is to be increased, it is only sufficient to enlarge the space (in the left-right direction of FIG. 1) between the switching device 40a and the switching device 40b in the air passage 2 and increase the cross-sectional area of each of the moisture adsorption/desorption devices 10a and 10b. Accordingly, it is possible to suppress increase in size of the main body 1 in the width direction (in the up-down direction of FIG. 1). Note that the shape of the porous flat plates may be any shape that has pores each with a polygonal section along the cross section of the pipeline and that can achieve the same advantages.

Furthermore, the moisture adsorption/desorption devices 10a and 10b and the cooling device 20 are disposed substantially in series in the air flowing direction of either of the air paths A and B, and the cooling device 20 is provided between the moisture adsorption/desorption device 10a and the moisture adsorption/desorption device 10b. By disposing the moisture adsorption/desorption devices 10a and 10b and the cooling device 20 so that the sides through which the air passes face each other, these devices can be housed in a small space inside the air passage 2, and, thus, it is possible to downsize the dehumidifying system. Note that "face each other" can be somewhat deviated in angle, and in this case, a similar advantage can be obtained.

The surfaces of the porous flat plates constituting the moisture adsorption/desorption devices 10a and 10b are coated, surface treated, or impregnated with an adsorbent, such as zeolite, silica gel, or active carbon, having properties such as adsorbing moisture (absorbing moisture) from air that has relatively high humidity and desorbing moisture (releasing moisture) into air that has relatively low humidity. These adsorbent has a moisture amount that can be adsorbed with respect to the relative humidity of the air (equilibrium adsorption capacity). When the adsorbent reaches its equilibrium adsorption capacity after adsorbing moisture from air with a certain relative humidity, the adsorbent reaches an equilibrium state and is unable to adsorb any further amount of moisture. Accordingly, the adsorbent needs to be returned to a state allowing adsorption before reaching an equilibrium state by desorbing moisture into the air.

The cooling device 20 is provided to cool the air that has passed through the moisture adsorption/desorption device 10a or the moisture adsorption/desorption device 10b to a dew point or lower and to increase the relative humidity of the air, as well as an object to remove the moisture included in the air as condensed water. The moisture that has been condensed with the cooling device 20 is drained out of the main body 1 by providing a drainage channel (not shown), for example, that is similar to that of a typical dehumidifying system.

An evaporator that is a low-temperature-side heat exchanger of the heat pump is used as the cooling device 20, and a high-temperature-side heat exchanger of the heat pump is used as the heating device 50. The cooling device 20 and the heating device 50 are connected by pipes (not shown) and constitute a refrigerant circuit. A temperature sensor is provided to a pipe of each of the heat exchangers. The refrigerant circuit is controlled such that each of the heat exchangers has a heating temperature or a cooling temperature optimum for the dehumidifying operation on the basis of information on temperature measured by the corresponding temperature sensor.

The air sending device 30 includes a fan and can set the air volume of the air flowing inside the air passage 2 in accordance with the condition of the air. When a DC motor is used as the motor to rotate the fan, the air volume can be controlled by varying the current value to control the rotation speed, and when an AC motor is used, the air volume can be controlled by varying the power supply frequency by inverter control to control the rotation speed.

Furthermore, control of the air volume of the air sending device 30 also changes the flow velocity of the air passing through the moisture adsorption/desorption devices 10a and 10b. The adsorption/desorption rate (moisture transfer rate between the air and the adsorbent during adsorption/desorption) of the adsorbent used in the moisture adsorption/desorption devices 10a and 10b increases when the flow velocity of the air passing through the adsorbent increases. Thus, the adsorption/desorption capacity of the adsorbent can be increased by increasing the air velocity of the air sending device 30.

Note that in the first embodiment of the invention, the air sending device 30 is disposed in the most downstream position inside the air passage 2; however, as long as the target air volume in each of the air paths A and B is obtained, the air sending device 30 may be disposed at a position further upstream than the position of disposition in FIG. 1, such as in the most upstream position inside the air passage 2, and, further, may be disposed in plural numbers such as on the upstream side and on the downstream side; the position of disposition and the number of the air sending devices 30 are not limited.

An operation of the dehumidifying system according to the first embodiment of the invention will be described in the following.

Figure 2:
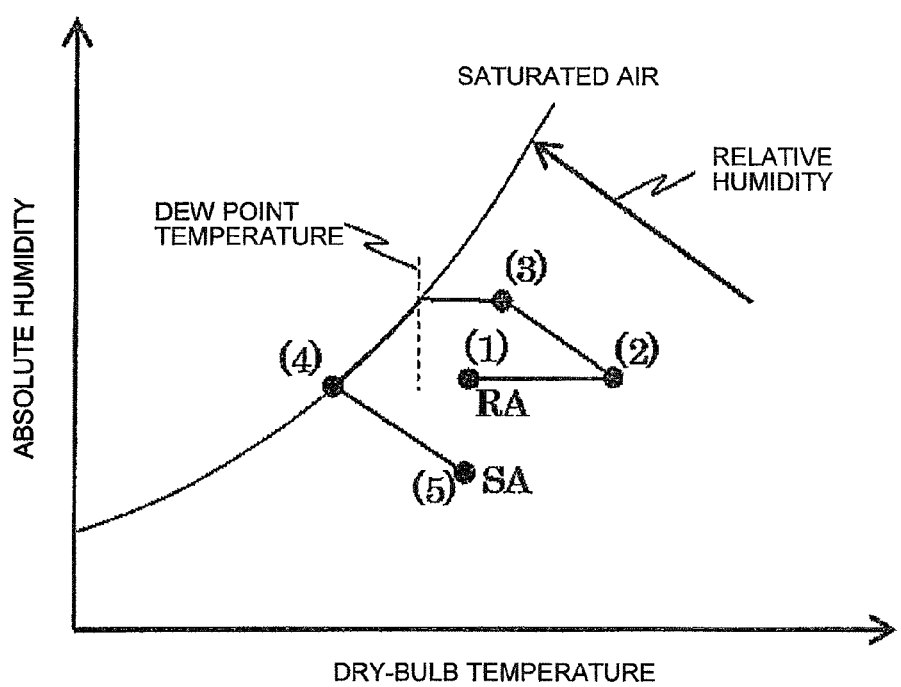
FIG. 2 is a psychrometric chart showing change in air condition during operation of the dehumidifying system according to the first embodiment of the invention.

FIG. 2 is a psychrometric chart illustrating state changes of the air during operation of the dehumidifying system illustrated in FIG. 1. The axis of ordinates of the psychrometric chart in FIG. 2 is absolute humidity of the air and the axis of abscissas thereof is dry-bulb temperature of the air. Furthermore, the curved line in FIG. 2 illustrates the saturated air, and the relative humidity of the saturated air is 100%. Additionally, the dotted line in FIG. 2 illustrates a dew point temperature and is the dry-bulb temperature when in a saturated air state. In FIG. 2, the air states are denoted in the psychrometric chart as (1) to (5) which correspond to A(1) to A(5) in FIG. 1(a), respectively, and to B(1) to B(5) in FIG. 1(b), respectively.

State changes of the air in the case of the air path A will be described with reference to FIGS. 2 and 1(a).

The indoor air in state (1) is introduced into the inlet port 3 of the air passage 2 and flows into the heating device 50. The air that has flowed into the heating device 50 is heated when passing through the heating device 50. The dry-bulb temperature is increased while the absolute humidity is in a substantially uniform state, thus turning the air into state (2). This state change is changed in a direction away from the saturated air curve, and, thus, the relative humidity of state (2) is lower than that of state (1). As above, during the state change from (1) to (2), the relative humidity of the air is reduced such that the air is changed into a state in which desorption of moisture is facilitated in the moisture adsorption/desorption device 10a through which the air passes next.

The air in state (2) flows into the moisture adsorption/desorption device 10a. Since the moisture adsorption/desorption device 10a desorbs moisture into the air in accordance with the amount of moisture included in the moisture adsorption/desorption device 10a, the air that has passed through the moisture adsorption/desorption device 10a is humidified; accordingly, the dry-bulb temperature is reduced and, further, the absolute humidity is increased, turning the air into state (3). Furthermore, the dew point temperature is increased due to increase in absolute humidity. Here, the reduction in dry-bulb temperature is caused by endothermic reaction during desorption of the moisture adsorption/desorption device 10a. In this way, in the state change from (2) to (3), owing to the desorption reaction of the moisture adsorption/desorption device 10a, the air is humidified and the dew point temperature is increased such that the air is changed into a state in which condensation of moisture is facilitated in the cooling device 20 through which the air passes next.

The air in state (3) flows into the cooling device 20. The air that has flowed into the cooling device 20 is cooled to a dew point temperature or lower when passing through the cooling device 20 and is turned into state (4). By cooling the air to the dew point temperature or lower, moisture amounting to the difference between that of the absolute humidity of state (3) and that of the absolute humidity of state (4) is condensed, and, thus, the air is dehumidified. Furthermore, the cooling turns the air into saturated air and the relative humidity of the air is increased to approximately 100%.

As above, during the state change from (3) to (4), the air is dehumidified and, further, the relative humidity of the air is increased such that the air is changed into a state in which adsorption of moisture is facilitated in the moisture adsorption/desorption device 10b through which the air passes next.

The air in state (4) flows into the moisture adsorption/desorption device 10b. Since the moisture adsorption/desorption device 10b absorbs moisture from the air in accordance with the amount of moisture included in the moisture adsorption/desorption device 10b, the air that has passed through the moisture adsorption/desorption device 10b is dehumidified; accordingly, the dry-bulb temperature is increased and, further, the absolute humidity is reduced, turning the air into state (5). Here, the increase in dry-bulb temperature is caused by exothermic reaction during adsorption of the moisture adsorption/desorption device 10b. As above, during the state change from (4) to (5), owing to the adsorption reaction of the moisture adsorption/desorption device 10b, the air is dehumidified and is changed into humidity-controlled air that is to be supplied to the indoor space.

The air in state (5) is supplied to the indoor space as humidity-controlled air from the outlet port 4 of the air passage 2 via the air sending device 30.

State changes of the air in the case of the air path B will be described next with reference to FIGS. 2 and 1(*b*).

The indoor air in state (1) is introduced into the inlet port 3 of the air passage 2 and flows into the heating device 50. The air that has flowed into the heating device 50 is heated when passing through the heating device 50. The dry-bulb temperature is increased while the absolute humidity is in a substantially uniform state, thus turning the air into state (2). This state change is in a direction away from the saturated air curve, and, thus, the relative humidity of state (2) is lower than that of state (1). As above, during the state change from (1) to (2), the relative humidity of the air is reduced such that the air is changed into a state in which desorption of moisture is facilitated in the moisture adsorption/desorption device 10*b* through which the air passes next.

The air in state (2) flows into the moisture adsorption/desorption device 10*b*. Since the moisture adsorption/desorption device 10*b* desorbs moisture into the air in accordance with the amount of moisture included in the moisture adsorption/desorption device 10*b*, the air that has passed through the moisture adsorption/desorption device 10*b* is humidified; accordingly, the dry-bulb temperature is reduced and, further, the absolute humidity is increased, turning the air into state (3). Furthermore, the dew point temperature is increased due to increase in absolute humidity. Here, the reduction in dry-bulb temperature is caused by endothermic reaction during desorption of the moisture adsorption/desorption device 10*b*. In this way, in the state change from (2) to (3), owing to the desorption reaction of the moisture adsorption/desorption device 10*b*, the air is humidified and the dew point temperature is increased such that the air is changed into a state in which condensation of moisture is facilitated in the cooling device 20 through which the air passes next.

The air in state (3) flows into the cooling device 20. The air that has flowed into the cooling device 20 is cooled to a dew point temperature or lower when passing through the cooling device 20 and is turned into state (4). By cooling the air to the dew point temperature or lower, moisture amounting to the difference between that of the absolute humidity of state (3) and that of the absolute humidity of state (4) is condensed, and, thus, the air is dehumidified. Furthermore, the cooling turns the air into saturated air and the relative humidity of the air is increased to approximately 100%.

As above, during the state change from (3) to (4), the air is dehumidified and, further, the relative humidity of the air is increased such that the air is changed into a state in which adsorption of moisture is facilitated in the moisture adsorption/desorption device 10*a* through which the air passes next.

The air in state (4) flows into the moisture adsorption/desorption device 10*a*. Since the moisture adsorption/desorption device 10*a* absorbs moisture from the air in accordance with the amount of moisture included in the moisture adsorption/desorption device 10*a*, the air that has passed through the moisture adsorption/desorption device 10*a* is dehumidified; accordingly, the dry-bulb temperature is increased and, further, the absolute humidity is reduced, turning the air into state (5). Here, the increase in dry-bulb temperature is caused by exothermic reaction during adsorption of the moisture adsorption/desorption device 10*a*. As above, during the state change from (4) to (5), owing to the adsorption reaction of the moisture adsorption/desorption device 10*a*, the air is dehumidified and is changed into humidity-controlled air that is to be supplied to the indoor space.

The air in state (5) is supplied to the indoor space as humidity-controlled air from the outlet port 4 of the air passage 2 via the air sending device 30.

The switching between the air path A and the air path B is carried out by operating the switching devices 40*a* and 40*b*. The switching between the air path A and the air path B makes the moisture adsorption/desorption device 10*a* that has been carrying out desorption reaction in the air path A to carry out adsorption reaction in the air path B, and makes the moisture adsorption/desorption device 10*b* that has been carrying out adsorption reaction in the air path A to carry out desorption reaction in the air path B. In this way, owing to the switching operations of the switching devices 40*a* and 40*b*, since the moisture adsorption/desorption devices 10*a* and 10*b* do not reach an equilibrium state, it is possible to carry out the dehumidifying operation continuously.

As described above, in the first embodiment of the invention, the switching of the air paths A and B with the switching devices 40*a* and 40*b* is controlled such that the switching is carried out at a predetermined time interval. For example, control is carried out such that the air paths are switched every three minutes. The dehumidifying system of the invention is not for use in dehumidifying operations of air in a large space where environmental change is large, such as an outdoor space. The dehumidifying system is for carrying out dehumidifying operations with air that is in a small space where environmental change is small, such as an indoor space. Accordingly, it is easier to estimate the condition in which the moisture adsorption/desorption devices 10*a* and 10*b* reach an equilibrium state. Therefore, by switching the air paths at a predetermined time interval, it is possible to maintain a state in which the adsorption and desorption capacities of the moisture adsorption/desorption devices 10*a* and 10*b* are sufficiently exhibited and, thus, allow the dehumidifying operation to be carried out continuously. Furthermore, the switching time interval settings for optimizing the dehumidification capacity can be changed by external operation.

When optimizing the dehumidification capacity as above in accordance with the air state of the indoor space with a conventional desiccant rotor, optimization of the dehumidification capacity can be achieved by varying the rotation speed of the desiccant rotor; however, since there exists a sliding surface, when the rotation speed increases, the frictional resistance of the rotating shaft increases and unnecessary input tends to increase. The dehumidifying system of the invention employs the moisture adsorption/desorption devices 10*a* and 10*b* that do not have any sliding surface and can obtain the same advantages by varying the switching time interval of the switching devices 40*a* and 40*b*; hence there occurs no unnecessary input caused by friction and the system is energy-saving.

Furthermore, the moisture adsorption/desorption device 10*a* and the moisture adsorption/desorption device 10*b* are disposed substantially in series in the direction of the air flow inside the single air passage 2 and the switching devices 40*a* and 40*b* switch the air paths; accordingly, there occurs no reduction in the dehumidification capacity due to air leakage from the sliding surface unlike in the case of the desiccant rotor. Additionally, since there is no sliding surface in the moisture adsorption/desorption devices 10*a* and 10*b*, it is possible to improve the durability of the dehumidifying system.

The flow directions of the air in the moisture adsorption/desorption devices 10*a* and 10*b* during adsorption and desorption are opposite to each other and the direction of the air passing therethrough during adsorption and desorption is reversed; accordingly, it is possible to increase the dehumidification/humidification efficiency.

Further, since the moisture adsorption/desorption devices 10a and 10b are secured and are motionless, there is no geometrical restriction in order to allow rotational motion or the like as in the case of the desiccant rotor; accordingly, it is possible to match the air passage area of the moisture adsorption/desorption devices 10a and 10b with the shape of the air passage 2. It is further possible to reduce pressure loss by increasing the air passage area and reducing the air velocity, and to increase the adsorption/desorption amount by increasing the area of the adsorbent of the moisture adsorption/desorption devices 10a and 10b that is in contact with the air.

Further, the air passing through the cooling device 20 has a high dew point temperature since humidification is carried out by the desorption reaction of the moisture adsorption/desorption device 10a or the moisture adsorption/desorption device 10b. Accordingly, it is possible to condense and dehumidify the air that has passed through the cooling device 20 even in a case in which the temperature of the cooling section of the cooling device 20 is set high; accordingly, the input to the cooling device 20 can be reduced, compared to the input in which a similar dehumidification is carried out with the cooling device 20 alone.

Further, since the air that has passed through the cooling device 20 is dehumidified with the adsorption reaction of the moisture adsorption/desorption device 10b or 10a, it is possible to dehumidify a larger amount of air, compared to a case in which dehumidification is carried out with the cooling device 20 alone with the same cooling section temperature.

Furthermore, by controlling the heating temperature of the heating device 50, it is possible to make the temperature of the air of the indoor space and the temperature of the humidity-controlled air to be the same; accordingly, it is possible to carry out isothermal dehumidification.

Second Embodiment

With an aspect described in the first embodiment of the invention, the problems of the known rotating desiccant rotor have been overcome. However, since the heating device 50 serving as a desorption heat source is provided in order to increase the desorption capacity of the moisture adsorption/desorption devices 10a and 10b, the quantity of heat provided by the heating device 50 contained in the air needs to be treated by the cooling device 20, leading to decrease in treatment efficiency of the sensible heat and the latent heat.

Thus, in the dehumidifying system according to the second embodiment of the invention, as regards the adsorbent employed in the moisture adsorption/desorption device, an adsorbent with properties such as a large equilibrium adsorption capacity (the moisture amount that can be adsorbed with respect to the relative humidity of the air) at relative humidity ranging from 80 to 100% and a large difference between the equilibrium adsorption capacity at relative humidity ranging from 80 to 100% and an equilibrium adsorption capacity at relative humidity ranging from 40 to 60% is employed. In the second embodiment, description will be given of a dehumidifying system that allows continuous dehumidifying operation similar to that of the first embodiment without the heating device 50 serving as a desorption heat source by employing the adsorbent having the above properties.

Figure 3:
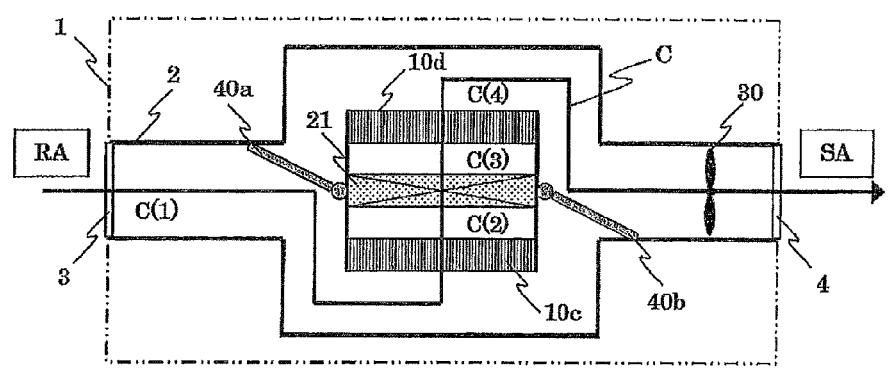
FIG. 3 is a schematic configuration diagram of a dehumidifying system according to a second embodiment of the invention.
Figure 3:
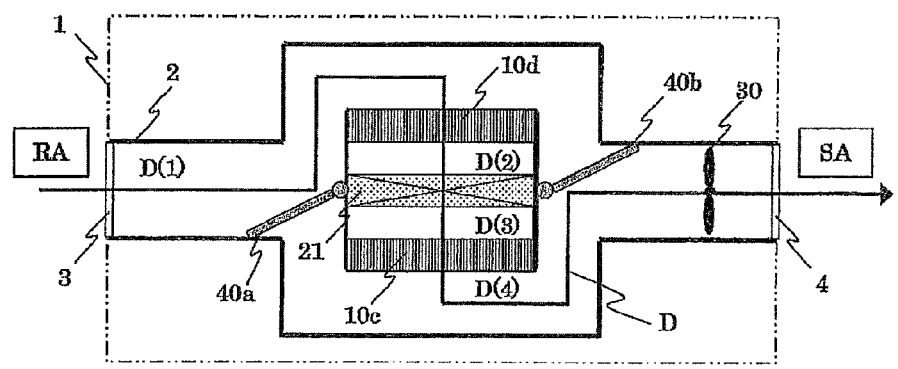

FIG. 3 is a schematic configuration diagram of the dehumidifying system according to the second embodiment of the invention when seen from above. Note that parts same as those in FIG. 1 are designated by like reference numerals and description thereof is omitted.

In FIG. 3, reference characters C and D each denotes a path of the air flowing in the air passage 2. FIG. 3(a) is a sucking of an air path C, FIG. 3(b) is that of an air path D. The air path C is a path in which indoor air is sucked from the inlet port 3, passes through a moisture adsorption/desorption device 10c, a cooling device 21, and a moisture adsorption/desorption device 10d, passes through the air sending device 30, and is supplied into the indoor space as humidity-controlled air. The air path D is a path in which indoor air is sucked from the inlet port 3, passes through the moisture adsorption/desorption device 10d, the cooling device 21, and the moisture adsorption/desorption device 10c, passes through the air sending device 30, and is supplied into the indoor space as humidity-controlled air from the outlet 4.

As shown in FIG. 3, similarly to the moisture adsorption/desorption devices 10a and 10b and the cooling device 20 of the first embodiment, the moisture adsorption/desorption devices 10c and 10d and the cooling device 21 are disposed substantially in series in the air flowing direction of either of the air paths C and D, and the cooling device 21 is provided between the moisture adsorption/desorption device 10c and the moisture adsorption/desorption device 10d.

In order to obtain a large cross-sectional area in which the air passes, the moisture adsorption/desorption devices 10c and 10d each include porous flat plates having pores each with a polygonal section along the cross section of the pipeline in the portion of the air passage 2 where the moisture adsorption/desorption devices 10c and 10d is disposed. The pores are structured such that air can pass through in the thickness direction of the porous flat plate. Furthermore, the surfaces of the porous flat plates are coated, surface treated, or impregnated with an adsorbent having properties such as adsorbing moisture from air that has relatively high humidity and desorbing moisture into air that has relatively low humidity, and a large equilibrium adsorption capacity at relative humidity ranging from 80 to 100% and a large difference between the equilibrium adsorption capacity at relative humidity ranging from 80 to 100% and an equilibrium adsorption capacity at relative humidity ranging from 40 to 60%.

Figure 4:
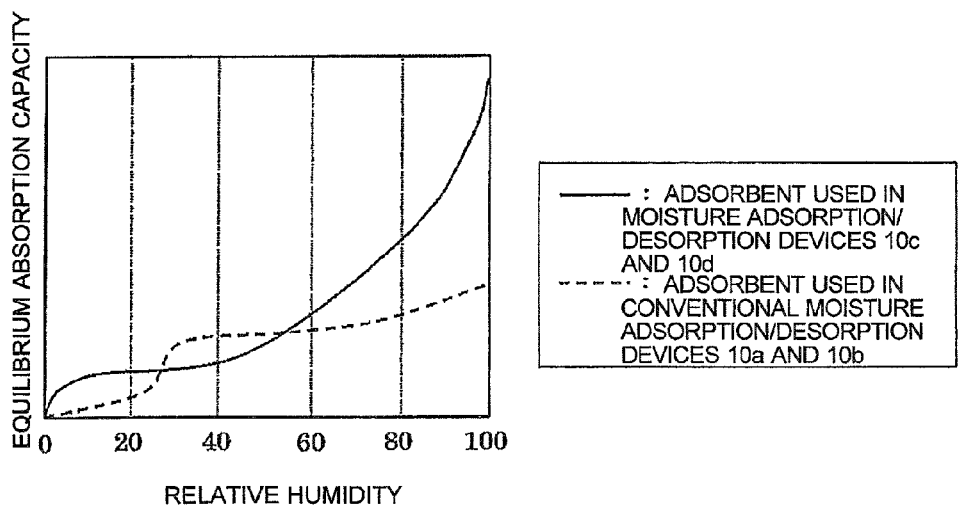
FIG. 4 is a psychrometric chart showing change in air condition during operation of the dehumidifying system according to the second embodiment of the invention.

In FIG. 4, a relationship between the relative humidity and the equilibrium adsorption capacity of the adsorbent employed in the moisture adsorption/desorption devices 10c and 10d are illustrated. The axis of ordinates is the equilibrium adsorption capacity, and the axis of abscissas is the relative humidity. The solid-line curve illustrates a property of the adsorbent employed in the moisture adsorption/desorption devices 10c and 10d, and the broken-line curve illustrates a property of a known adsorbent employed in, for example, the moisture adsorption/desorption devices 10a and 10b of the first embodiment.

As illustrated in FIG. 4, the adsorbent employed in the moisture adsorption/desorption devices 10c and 10d have properties such as the equilibrium adsorption capacity increasing in a substantially linear manner with respect to the air with a relative humidity ranging from 40 to 100%, and an especially large equilibrium adsorption capacity in the high-humidity region (relative humidity ranging from 80 to 100%). That is, the adsorption/desorption capacity can be increased by increasing the difference between the relative humidity of the air that passes through the moisture adsorption/desorption devices 10c and the relative humidity of the air that passes through the moisture adsorption/desorption devices 10d during adsorption and desorption of the moisture adsorption/desorption devices 10c and 10d.

The equilibrium adsorption capacity of known adsorbents increases only slightly with respect to the increase in relative humidity. Accordingly, when dehumidification of air (relative humidity ranging from about 40 to approximately 60%) in a typical indoor space is carried out using a known adsorbent, the air needs to be heated with a heating device or the like before desorption to reduce the relative humidity of the air to approximately 20% in order to create a difference between the equilibrium adsorption capacity of the adsorbent in which the air passes during adsorption and the equilibrium adsorption capacity of the adsorbent in which the air passes during desorption.

On the other hand, the dehumidifying system according to the second embodiment of the invention employs, in the moisture adsorption/desorption devices 10c and 10d, an adsorbent that has an especially large equilibrium adsorption capacity in the high-humidity region (relative humidity ranging from 80 to 100%); hence, it is possible to create sufficient difference with the equilibrium adsorption capacity with respect to the air (relative humidity ranging from about 40 to approximately 60%) in a typical indoor space without heating the indoor air and reducing the relative humidity. Therefore, by employing an adsorbent having the above properties, a dehumidifying operation can be carried out without a desorption heat source in the air passage 2, and consequently, the heating device 50 of the first embodiment is omitted and downsizing of the system is allowed.

Furthermore, by omitting the desorption heat source from the air passage 2, the cooling device 21 does not need to carry out treatment of the quantity of heat provided by the heating device 50 contained in the air. Accordingly, the cooling device 21 only carries out heat treatment of the indoor air and, thus, energy is saved.

Additionally, by omitting the desorption heat source, the temperature difference between the temperature of the moisture adsorption/desorption device 10c and that of the moisture adsorption/desorption device 10d becomes small when the air passage is switched during the dehumidifying operation and, further, the temperature difference between the temperature of the moisture adsorption/desorption devices 10c and 10d and that of the air passing through the moisture adsorption/desorption devices 10c and 10d becomes small; hence, thermal resistance of the adsorbent generated by the temperature difference between the passing air of the moisture adsorption/desorption devices 10c and 10d and the moisture adsorption/desorption devices 10c and 10d is reduced and it is possible to carry out the dehumidifying operation with high efficiency.

An adsorbent having such properties includes, sodium polyacrylate crosslinked product as for organic adsorbents, and nanotube silicate (imogolite) or aluminum silicate (HAS-clay) as for inorganic adsorbents.

The cooling device 21 employs a brine cooler or the like, and although not shown, brine that has been cooled by a brine circuit is made to pass through pipes of a fin-and-tube heat exchanger. Air is cooled by passing through this heat exchanger. The cooling temperature is measured by a temperature sensor (not shown) provided to a pipe of the heat exchanger and is controlled so as to become an optimum temperature for the dehumidifying operation. Furthermore, by controlling the temperature of the brine passing through the pipes with this temperature sensor, the temperature of the humidity-controlled air supplied to the indoor space can be turned into the externally set target temperature.

When a brine cooler is used as the cooling device 21, cooling is carried out with brine that has exchanged heat in a refrigerating machine that is separately provided outside the main body 1; accordingly, cooling capacity can be obtained without a high-temperature heating source such as the heating device 50 of the first embodiment. Accordingly, a heating device can be omitted in the main body 1 and downsizing of the dehumidifying system is allowed.

An operation of the dehumidifying system according to the second embodiment of the invention will be described in the following.

Figure 5:
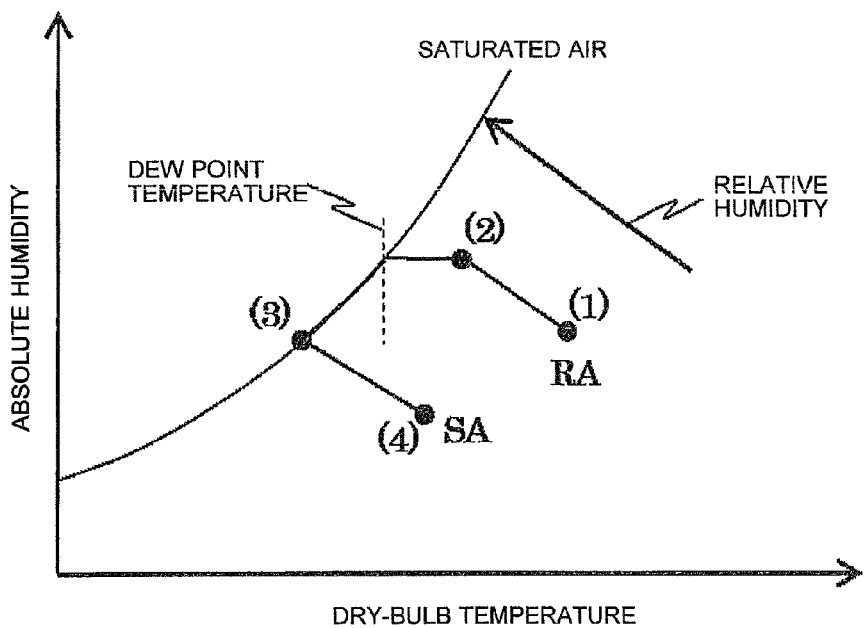
FIG. 5 is a diagram illustrating a relationship between a relative humidity and an equilibrium adsorption capacity of the adsorbent used in the moisture adsorption/desorption devices of the dehumidifying system according to the second embodiment of the invention.

FIG. 5 is a psychrometric chart illustrating state changes of the air during operation of the dehumidifying system illustrated in FIG. 3. In FIG. 5, the air states are denoted in the psychrometric chart as (1) to (4) which correspond to C(1) to C(4) in FIG. 3(a), respectively, and to D(1) to D(4) in FIG. 3(b), respectively.

State changes of the air in the case of the air path C will be described with reference to FIGS. 5 and 3(a).

The indoor air in state (1) is introduced into the inlet port 3 of the air passage 2 and flows into the moisture adsorption/desorption device 10c. Since the moisture adsorption/desorption device 10c desorbs moisture into the air in accordance with the amount of moisture included in the moisture adsorption/desorption device 10c, the air that has passed through the moisture adsorption/desorption device 10c is humidified; accordingly, the dry-bulb temperature is reduced and, further, the absolute humidity is increased, turning the air into state (2). Furthermore, the dew point temperature is increased due to increase in absolute humidity. Here, the reduction in dry-bulb temperature is caused by endothermic reaction during desorption of the moisture adsorption/desorption device 10c. In this way, in the state change from (1) to (2), owing to the desorption reaction of the moisture adsorption/desorption device 10c, the air is humidified and the dew point temperature is increased such that the air is changed into a state in which condensation of moisture is facilitated in the cooling device 21 through which the air passes next.

The air in state (2) flows into the cooling device 21. The air that has flowed into the cooling device 21 is cooled to a dew point temperature or lower when passing through the cooling device 21 and is turned into state (3). By cooling the air to the dew point temperature or lower, moisture amounting to the difference between that of the absolute humidity of state (2) and that of the absolute humidity of state (3) is condensed, and, thus, the air is dehumidified. Furthermore, the cooling turns the air into saturated air and the relative humidity of the air is increased to approximately 100%. As above, during the state change from (2) to (3), the air is dehumidified and, further, the relative humidity of the air is increased such that the air is changed into a state in which adsorption of moisture is facilitated in the moisture adsorption/desorption device 10d through which the air passes next.

The air in state (3) flows into the moisture adsorption/desorption device 10d. Since the moisture adsorption/desorption device 10d absorbs moisture from the air in accordance with the amount of moisture included in the moisture adsorption/desorption device 10d, the air that has passed through the moisture adsorption/desorption device 10d is dehumidified; accordingly, the dry-bulb temperature is increased and, further, the absolute humidity is reduced, turning the air into state (4). Here, the increase in dry-bulb temperature is caused by exothermic reaction during adsorption of the moisture adsorption/desorption device 10d. As above, during the state change from (3) to (4), owing to the adsorption reaction of the moisture adsorption/desorption device 10d, the air is dehumidified and is changed into humidity-controlled air that is to be supplied to the indoor space.

The air in state (4) is supplied to the indoor space as humidity-controlled air from the outlet port 4 of the air passage 2 via the air sending device 30.

State changes of the air in the case of the air path D will be described next with reference to FIGS. 5 and 3(*b*).

The indoor air in state (1) is introduced into the inlet port 3 of the air passage 2 and flows into the moisture adsorption/desorption device 10*d*. Since the moisture adsorption/desorption device 10*d* desorbs moisture into the air in accordance with the amount of moisture included in the moisture adsorption/desorption device 10*d*, the air that has passed through the moisture adsorption/desorption device 10*d* is humidified; accordingly, the dry-bulb temperature is reduced and, further, the absolute humidity is increased, turning the air into state (2). Furthermore, the dew point temperature is increased due to increase in absolute humidity. Here, the reduction in dry-bulb temperature is caused by endothermic reaction during desorption of the moisture adsorption/desorption device 10*d*. In this way, in the state change from (1) to (2), owing to the desorption reaction of the moisture adsorption/desorption device 10*d*, the air is humidified and the dew point temperature is increased such that the air is changed into a state in which condensation of moisture is facilitated in the cooling device 21 through which the air passes next.

The air in state (2) flows into the cooling device 21. The air that has flowed into the cooling device 21 is cooled to a dew point temperature or lower when passing through the cooling device 21 and is turned into state (3). By cooling the air to the dew point temperature or lower, moisture amounting to the difference between that of the absolute humidity of state (2) and that of the absolute humidity of state (3) is condensed, and, thus, the air is dehumidified. Furthermore, the cooling turns the air into saturated air and the relative humidity of the air is increased to approximately 100%. As above, during the state change from (2) to (3), the air is dehumidified and, further, the relative humidity of the air is increased such that the air is changed into a state in which adsorption of moisture is facilitated in the moisture adsorption/desorption device 10*c* through which the air passes next.

The air in state (3) flows into the moisture adsorption/desorption device 10*c*. Since the moisture adsorption/desorption device 10*c* absorbs moisture from the air in accordance with the amount of moisture included in the moisture adsorption/desorption device 10*c*, the air that has passed through the moisture adsorption/desorption device 10*c* is dehumidified; accordingly, the dry-bulb temperature is increased and, further, the absolute humidity is reduced, turning the air into state (4). Here, the increase in dry-bulb temperature is caused by exothermic reaction during adsorption of the moisture adsorption/desorption device 10*c*. As above, during the state change from (3) to (4), owing to the adsorption reaction of the moisture adsorption/desorption device 10*c*, the air is dehumidified and is changed into humidity-controlled air that is to be supplied to the indoor space.

The air in state (4) is supplied to the indoor space as humidity-controlled air from the outlet port 4 of the air passage 2 via the air sending device 30.

In the dehumidifying system of the second embodiment of the invention, the switching operation of the air paths C and D with the switching devices 40*a* and 40*b* is, similar to the first embodiment, controlled so as to be carried out at a constant time period and, thus, advantages similar to that of the first embodiment can be obtained.

Furthermore, the adsorption/desorption rate (moisture transfer rate between the air and the adsorbent during adsorption/desorption) of the adsorbent that is used in the moisture adsorption/desorption devices 10*c* and 10*d* has air velocity dependence in addition to temperature dependence; accordingly, the higher the temperature becomes, the higher the adsorption/desorption rate becomes.

Figure 6:
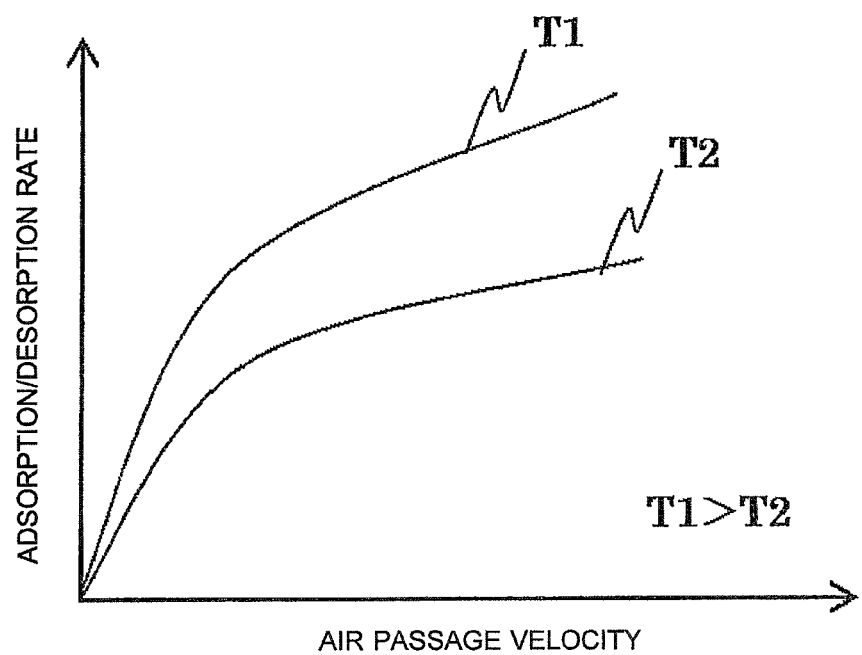
FIG. 6 is a diagram illustrating a relationship between air passage velocity and an adsorption/desorption rate of the adsorbent used in the moisture adsorption/desorption devices of the dehumidifying system according to the second embodiment of the invention.

FIG. 6 illustrates a relationship between the air passage velocity and the adsorption/desorption rate of the adsorbent used in the moisture adsorption/desorption device of the dehumidifying system. The axis of ordinates of FIG. 6 is the adsorption/desorption rate of the adsorbent and the axis of abscissas is the air passage velocity of the air passing through the adsorbent. T1 and T2 of FIG. 6 are temperatures of the air passing through the adsorbent during adsorption or desorption. T1 is higher than T2, and T1 having higher temperature has higher desorption rate.

Here, assuming that T1 is the air temperature during desorption and T2 is the air temperature during adsorption, when a dehumidifying operation is carried out at a constant air velocity, there will be a difference in the adsorption/desorption rate between that during adsorption and that during desorption since there is a difference in temperature between T1 and T2. At this time, the total amount of moisture transferred between the adsorbent and the air during adsorption and the total amount of moisture transferred between the adsorbent and the air during desorption are in equilibrium with the total amount having a slower adsorption/desorption rate.

The dehumidifying system according to the second embodiment of the invention does not heat the air during desorption; accordingly, the temperature difference during adsorption and that during desorption is smaller than the temperate difference when there is a desorption heat source. In Therefore, the difference between the adsorption rate and the desorption rate is smaller. Accordingly, the adsorption rate and the desorption rate become close to each other, allowing the adsorption/desorption capacity of the adsorbent to be used efficiently.

Third Embodiment

In the second embodiment of the invention, description is given of the switching of the air paths C and D with the switching devices 40*a* and 40*b* in which the switching is carried out at a predetermined time interval. When dehumidifying a space, such as an indoor space, that has little environmental change, it is possible to continue an optimum dehumidifying operation by switching air paths at a predetermined time interval; however, if the indoor environment is changed during the dehumidification operation, it is difficult to maintain the adsorption/desorption capacity of the moisture adsorption/desorption devices 10*c* and 10*d* with the switching carried out at a predetermined time interval, and, thus, lead to drop in dehumidification capacity.

Accordingly, a dehumidifying system according to a third embodiment of the invention disposes various sensors in the air passage 2 and switches the air paths C and D on the basis of information on the air state obtained by the sensors. With this, it is possible to keep the dehumidification capacity to a more optimum state and continue an optimum dehumidifying operation even when there is change in the state of the indoor air during the dehumidifying operation.

FIG. 7 is a schematic configuration diagram of the dehumidifying system according to the third embodiment of the invention when seen from above. FIG. 7(*a*) is a sucking of the air path C, FIG. 7(*b*) is that of the air path D. Note that parts same as those in FIG. 3 are designated by like reference numerals and description thereof is omitted.

As illustrated in FIG. 7, temperature-humidity sensors 5*a* and 5*b* that each measure temperature and humidity (it may be relative humidity or absolute humidity, wet-bulb temperature, or dew point temperature, hereinafter, the description "humidity" of the temperature-humidity sensor denotes a similar meaning) are disposed in the inlet port 3 and the outlet port 4 of the air passage 2. The temperature-humidity sensor 5a measures the temperature and humidity of the indoor air that has passed through the inlet port 3, and the temperature-humidity sensor 5b measures the temperature and humidity of the humidity-controlled air that passes through the outlet port 4.

Furthermore, a temperature sensor 6 is disposed in the cooling device 21. The temperature sensor 6 measures the cooling section temperature of the cooling device 21.

Moreover, an air velocity sensor 7 that measures the air velocity is disposed in the outlet port 4. The air velocity sensor 7 measures the air velocity of the humidity-controlled air passing through the outlet port 4.

Note that, as regards the temperature-humidity sensors 5a and 5b, since any device is applicable as long as the temperature of the measured area and any one of the relative humidity, the absolute humidity, the dew point temperature, and the wet-bulb temperature are known, measurements are carried out by two sensors such as a dry-bulb thermometer and a wet-bulb thermometer, and the number of the sensors is not limited.

Figure 8:
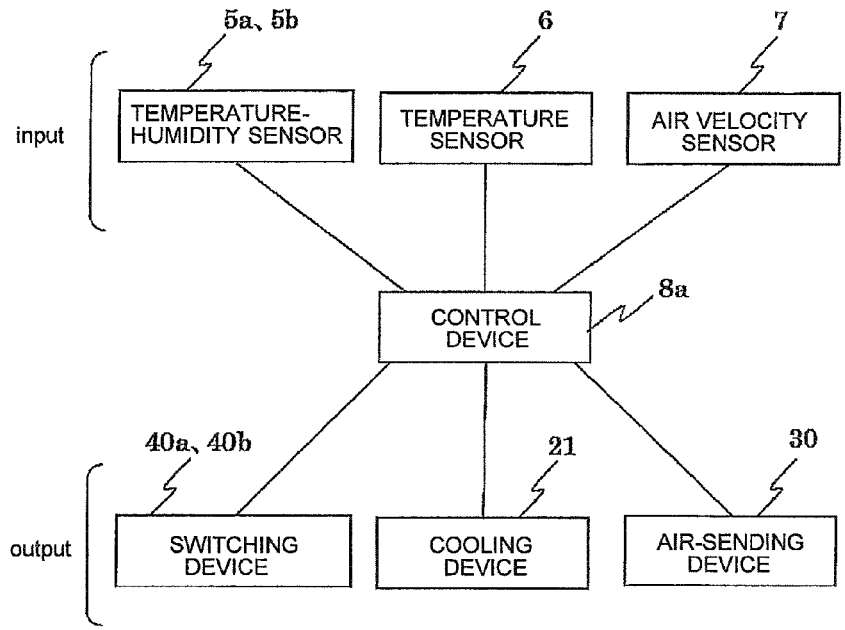
FIG. 8 is a control block diagram of the dehumidifying system according to the third embodiment of the invention.

In FIG. 8, a control block diagram of the dehumidifying system with the temperature-humidity sensors 5a and 5b, the temperature sensor 6, and the air velocity sensor 7 is illustrated. Each of the sensors is connected to a control device 8a that controls the dehumidifying system. The control device 8a acquires information on temperature-humidity, temperature, and air velocity from each of the respective sensors and, on the basis of these pieces of information, controls the cooling temperature of the cooling device 21, the air volume of the air sending device 30, and the switching operation of the switching devices 40a and 40b.

An operation of the dehumidifying system according to the third embodiment of the invention will be described in the following. Note that the manner in which the air in the air passage 2 flows and the basic state changes of the air in the air passage 2 are the same as those of the second embodiment; accordingly, description thereof will be omitted and the control operation of the control device 8a will be described.

Switching control of the air paths C and D in which the temperature-humidity sensors 5a and 5b are used will be described. During the dehumidifying operation, the absolute humidity of the humidity-controlled air is invariably lower than the absolute humidity of the indoor air since desorption and adsorption are carried out by the moisture adsorption/desorption devices 10c and 10d. Furthermore, when the moisture adsorption/desorption devices 10c and 10d approaches an equilibrium state after continuance of the dehumidifying operation, the adsorption/desorption capacity becomes small and the difference between the absolute humidity of the humidity-controlled air and the absolute humidity of the indoor air becomes small. The control device 8a carries out switching of the air paths on the basis of this change in absolute humidity.

The temperature-humidity sensor 5a measures the absolute humidity of the indoor air and the temperature-humidity sensor 5b measures the absolute humidity of the humidity-controlled air. Information on the absolute humidity measured by the temperature-humidity sensors 5a and 5b is sent to the control device 8a at all times. When the difference in absolute humidity becomes smaller than a preset threshold value, the control device 8a drives the switching devices 40a and 40b, and switches the air path C to the air path D or switches the air path D to the air path C.

In this way, by controlling the switching operation of the switching devices 40a and 40b on the basis of the change in absolute humidity of the indoor air and the humidity-controlled air, it is possible to reliably maintain the optimum state of the dehumidification capacity. Furthermore, even if the air state of the indoor air temporarily changes, the switching timing of the switching devices 40a and 40b is automatically modified on the basis of the information acquired by the sensors; accordingly, sudden drop in the adsorption/desorption capacity can be prevented and it is possible to continue the continuous dehumidifying operation.

Switching control of the air paths C and D in which the temperature sensor 6 and the temperature-humidity sensor 5b are used will be described.

When the air passes through the moisture adsorption/desorption device that serves as an adsorption portion during the dehumidifying operation (in the case of the air path C, the moisture adsorption/desorption device 10d, and in the case of the air path D, the moisture adsorption/desorption device 10c), the moisture adsorption/desorption device 10d or the moisture adsorption/desorption device 10c adsorbs moisture from the air and also releases heat; accordingly, the air temperature rises. Furthermore, when the equilibrium state is approached after continuance of the dehumidifying operation, the adsorption/desorption capacity becomes small along with a drop in the amount of heat release. When the amount of heat release drops, the temperature increase in the passing air becomes small; accordingly, the temperature difference between the temperature of the air passing through the cooling device 21 and the temperature of the humidity-controlled air becomes small. The control device 8a carries out switching of the air paths on the basis of this change in temperature.

The temperature sensor 6 measures the cooling section temperature of the cooling device 21, and the temperature-humidity sensor 5b measures the temperature of the humidity-controlled air. Information on the temperature measured by the temperature sensor 6 and the temperature-humidity sensor 5b is sent to the control device 8a at all times. When the difference in temperature becomes smaller than a preset threshold value, the control device 8a drives the switching devices 40a and 40b, and switches the air path C to the air path D or switches the air path D to the air path C.

In this way, by controlling the switching of the switching devices 40a and 40b on the basis of the change in temperature between the air before passing the absorption portion and the air after passing the absorption portion, it is possible to reliably maintain the optimum state of the dehumidification capacity. Furthermore, even if the air state of the indoor air temporarily changes, the switching timing of the switching devices 40a and 40b is automatically modified on the basis of the information acquired by the sensors; accordingly, sudden drop in the adsorption/desorption capacity can be prevented and it is possible to continue the continuous dehumidifying operation.

Air volume control of the air sending device 30 in which the air velocity sensor 7 is used will be described next.

The air volume control of the air sending device 30 is carried out in a case, such as when the space that is subject to dehumidification of the dehumidifying system of the invention is changed. For example, when the dehumidification target space is large, in order to increase the dehumidification capacity, the air velocity of the air sending device 30 is increased on the basis of the air velocity sensor 7. As illustrated in FIG. 6, the adsorption/desorption rate of the moisture adsorption/desorption devices 10c and 10d has air velocity dependence, and, In this way, when the air velocity is increased, the adsorption/desorption rate is also increased and the dehumidification capacity is increased.

Normally, when an optimum dehumidifying operation is carried out by using the temperature-humidity sensors 5a and 5b and the temperature sensor 6, the absolute humidity of the indoor air is decreased as time passes. At this time, when the absolute humidity of the indoor air does not change, it can be considered that the dehumidification capacity is lacking due to the largeness of the dehumidification target space. When the absolute humidity of the indoor air is measured by the temperature-humidity sensor 5a and the humidity of the indoor air does not change with elapse of time, then the control device 8a carries out control such that the air velocity of the air sending device 30 is increased on the basis of the air velocity sensor 7. In this way, it is possible to exert sufficient dehumidification capacity even in a case in which the dehumidification target space is large.

Note that the dehumidifying system according to the first embodiment of the invention can be provided with the various sensors in the same manner as the third embodiment and carry out switching control with the various sensors, as well as carrying out the control of switching the switching devices 40a and 40b at a constant time interval. In this way, a further optimum dehumidifying operation can be carried out.

Fourth Embodiment

A case in which an evaporator, which is a low-temperature-side heat exchanger of a heat pump, is used as the cooling device 21 of the dehumidifying system according to the third embodiment of the invention will be described.

Figure 9:
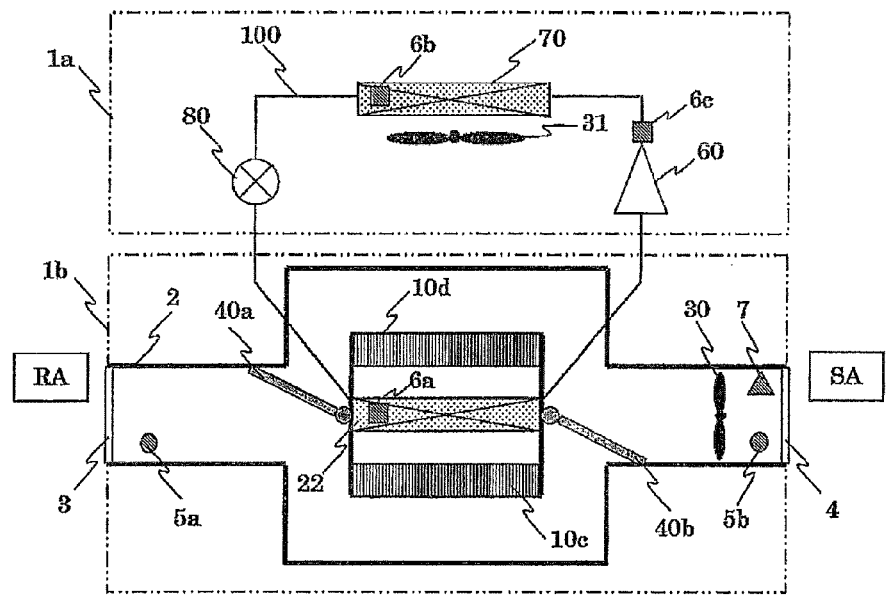
FIG. 9 is a schematic configuration diagram of a dehumidifying system according to a fourth embodiment of the invention.

FIG. 9 is a schematic configuration diagram of the dehumidifying system according to a fourth embodiment of the invention when seen from above. Note that parts same as those in FIG. 7 are designated by like reference numerals and description thereof is omitted.

As illustrated in FIG. 9, the dehumidifying system includes a main body 1a and a main body 1b, and the main body 1a is provided with a compressor 60, a condenser 70, and an expansion valve 80 that are connected with pipes to an evaporator 22 provided inside the air passage 2 inside the main body 1b, and, thus, a refrigerant circuit 100 is constituted. The evaporator 22 is provided inside the air passage 2 as a cooling device. Furthermore, the main body 1a is provided with an air sending device 31 configured to carry out air-cooling of the condenser 70.

The main body 1a and the main body 1b are connected by the pipes of the refrigerant circuit 100 and wiring such as a power source and signal wires. In the refrigerant circuit 100, the compressor 60, the condenser 70, the expansion valve 80, and a suction side of the evaporator 22 constitute a circuit in this order.

The refrigerant used in the refrigerant circuit 100 is not limited to a particular refrigerant and includes a natural refrigerant such as carbon dioxide, hydrocarbon, or helium; a refrigerant that does not contain chlorine such as HFC410A or HFC407C; or a fluorocarbon refrigerant such as R22 or R134 that is used in known products. Furthermore, as for the fluid machinery such as the compressor 60 that circulates such a refrigerant, various types such as a reciprocal, rotary, scroll, or screw type may be applied.

As regards the refrigerant flow during the operation of the refrigerant circuit 100, a high-temperature high-pressure gasified refrigerant that has been compressed first by the compressor 60 flows into the condenser 70. The refrigerant changes its phase from the high-temperature high-pressure gas to liquid in the condenser 70 and heats the air passing through the condenser 70. Then, the refrigerant is decompressed through the expansion valve 80. The refrigerant turns into a two-phase state in which a low-temperature low-pressure liquid and gas are mixed, and flows into the evaporator 22. In the evaporator 22, the refrigerant changes its phase from liquid to gas and cools the air passing through the evaporator 22. Then, the refrigerant flows into the compressor 60 and turns into a high-temperature high-pressure gas again.

In the dehumidifying system according to the fourth embodiment of the invention, a temperature sensor 6a that detects a pipe temperature of the evaporator 22, a temperature sensor 6b that detects a pipe temperature of the condenser 70, and a temperature sensor 6c for detection of a discharge temperature on the discharge side of the compressor 60 are provided instead of the temperature sensor 6 that is used in the third embodiment. Note that the manner in which the air in the air passage 2 flows and the basic state changes of the air in the air passage 2 are the same as those of the second and third embodiments; accordingly, description thereof will be omitted.

Figure 10:
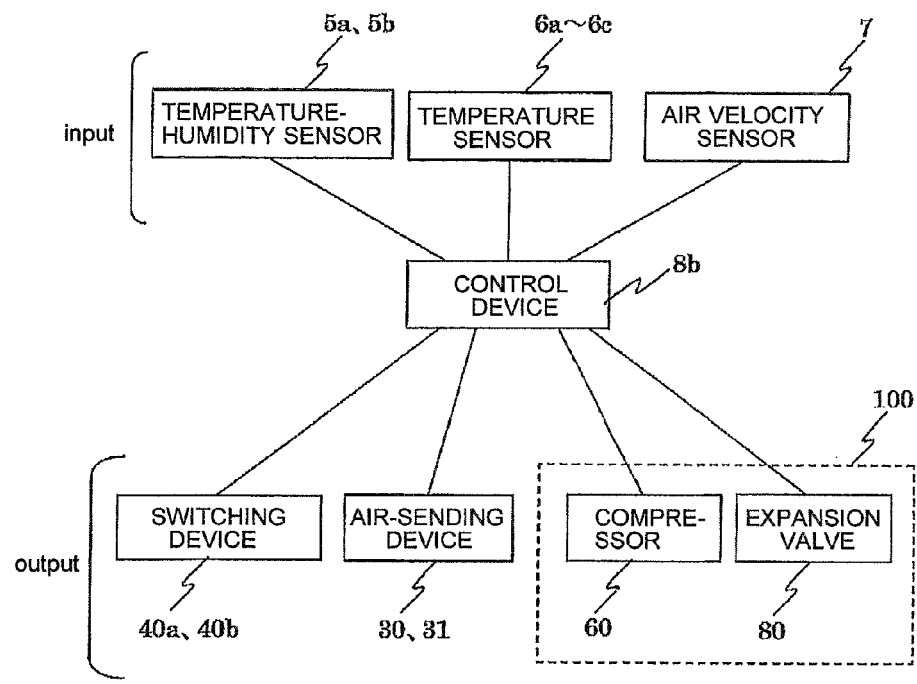
FIG. 10 is a control block diagram of the dehumidifying system according to the fourth embodiment of the invention.

In FIG. 10, a control block diagram with the temperature-humidity sensors 5a and 5b, the temperature sensors 6a to 6c, and the air velocity sensor 7 is illustrated. These sensors are connected to a control device 8b that controls the dehumidifying system. The control device 8b acquires information on temperature-humidity, temperature, and air velocity from each of the respective sensors and, on the basis of these pieces of information, controls the frequency of the compressor 60, the opening degree of the expansion valve 80, the air volume of the air sending devices 30 and 31, and the switching operation of the switching devices 40a and 40b. The refrigerant evaporating temperature of the evaporator 22 is controlled by controlling the opening degree of the expansion valve 80. Note that the controls of the air volume of the air sending device 30 and the switching of the switching devices 40a and 40b are the same as those of the third embodiment.

The dehumidifying system obtained as above can carry out highly efficient dehumidification by using the evaporator 22 of the heat pump instead of the cooling device 21, and can control the temperature of the humidity-controlled air supplied to the indoor space by changing the evaporating temperature of the refrigerant by changing the frequency of the compressor 60 and the opening degree of the expansion valve 80.

Furthermore, in the moisture adsorption/desorption devices 10c and 10d, the adsorbent with a property of having an especially large equilibrium adsorption capacity when the relative humidity ranges from 80 to 100% and a property of the equilibrium adsorption capacity increasing with respect to the increase of the relative humidity is used; hence, there is no need to employ a condenser 70 of the heat pump as a desorption heat source during desorption. Accordingly, it is possible to dispose the condenser 70 in a space (outdoor space, for example) different from the dehumidification target space (indoor space, for example). With the above arrangement, there will be no influence of the heat of the condenser 70 to the dehumidification target space and dehumidification with high efficiency can be carried out.

Furthermore, by controlling the air volume of the air sending device 31 disposed with the condenser 70, it is possible to control the condensing temperature of the refrigerant, and, as a result of reducing the difference between the evaporating temperature and the condensing temperature, the efficiency of the heat pump can be increased.

REFERENCE SIGNS LIST 1, 1a, 1b main body; 2 air passage; 3 inlet port; 4 outlet port; 5a-5b temperature-humidity sensor; 6, 6a-6c temperature sensor; 7 air velocity sensor; 8a, 8b control device; 10a-10d moisture adsorption/desorption device; 20 cooling device; 21 cooling device; 22 evaporator; 30 air sending device; 31 air sending device; 40a, 40b switching device; 50 heating device; 60 compressor; 70 condenser; 80 expansion valve; 100 refrigerant circuit.

The invention claimed is:

1. A dehumidifying system, comprising:
   a main body that includes an inlet port that sucks air from a dehumidification target space and an outlet port that supplies air to the dehumidification target space;
   an air passage provided in the main body, the air passage connecting the inlet port and the outlet port;
   a first moisture adsorption/desorption device including a first adsorbent in which a first equilibrium-adsorption capacity with respect to air with a relative humidity ranging from 40 to 100% increases in a substantially linear manner with respect to an increase in the relative humidity, the first adsorbent desorbs moisture to air with a low relative humidity, and absorbs moisture from air with a high relative humidity;
   a second moisture adsorption/desorption device disposed in the air passage and disposed so as to be spaced apart from the first moisture adsorption/desorption device, the second moisture adsorption/desorption device including a second adsorbent in which a second equilibrium-adsorption capacity with respect to air with a relative humidity ranging from 40 to 100% increases in a substantially linear manner with respect to an increase in the relative humidity, the second adsorbent desorbs moisture to air with a low relative humidity, and absorbs moisture from air with a high relative humidity;
   a cooling device disposed between the first moisture adsorption/desorption device and the second moisture adsorption/desorption device, the cooling device cooling air that has been humidified by desorption release of moisture from the first moisture adsorption/desorption device or the second moisture adsorption/desorption device; and
   switching devices disposed in the air passage, the switching devices switching between a first path in which the air sucked from the inlet port passes through the first moisture adsorption/desorption device, the cooling device, and the second moisture adsorption/desorption device in this order, and a second path in which the air sucked from the inlet port passes through the second moisture adsorption/desorption device, the cooling device, and the first moisture adsorption/desorption device in this order, wherein
   the first moisture adsorption/desorption device, the cooling device, and the second moisture adsorption/desorption device are disposed in series in an air flowing direction in the air passage so that sides through which air passes face each other, and
   during desorption, the air sucked from the inlet port directly flows into the first moisture adsorption/desorption device and the second moisture adsorption/desorption device without being heated to reduce relative humidity.

2. The dehumidifying system of claim 1, wherein
   the first moisture adsorption/desorption device and the second moisture adsorption/desorption device are secured and immobilized in the air passage.

3. The dehumidifying system of claim 1, wherein
   the first moisture adsorption/desorption device and the second moisture adsorption/desorption device are ventilator bodies each including a large number of small through holes.

4. The dehumidifying system of claim 1, wherein
   the first moisture adsorption/desorption device and the second moisture adsorption/desorption device are disposed such that air passage surfaces of the first moisture adsorption/desorption device and the second moisture adsorption/desorption device face air passage surfaces of the cooling device.

5. The dehumidifying system of claim 1, wherein
   the first moisture adsorption/desorption device, the cooling device, and the second moisture adsorption/desorption device are disposed such that a direction of air passing through the first moisture adsorption/desorption device, the cooling device, and the second moisture adsorption/desorption device is reversed by switching between the first and second paths of the air.

6. The dehumidifying system of claim 1, wherein
   the air passage includes a first bifurcation portion that is provided on an upstream side of the first moisture adsorption/desorption device and the second moisture adsorption/desorption device and that bifurcates a path into two directions, and a second bifurcation portion that is provided on a downstream side of the first moisture adsorption/desorption device and the second moisture adsorption/desorption device and that bifurcates a path into two directions, and
   the switching devices are each disposed in the first bifurcation portion and the second bifurcation portion.

7. The dehumidifying system of claim 1, further comprising
   a control device that controls a switching operation of the switching devices to be performed at a predetermined time interval.

8. The dehumidifying system of claim 1, further comprising:
   a first sensor that measures humidity information of air that has passed through the inlet port;
   a second sensor that measures humidity information of air that is to pass through the outlet port; and
   a control device that controls a switching operation of the switching devices on a basis of humidity information measured by the first and second sensors.

9. The dehumidifying system of claim 1, further comprising:
   a first sensor that measures humidity information of air that has passed through the inlet port;
   a second sensor that measures humidity information of air that is to pass through the outlet port; and
   a control device that controls a switching operation of the switching devices to be performed at a predetermined time interval and on a basis of humidity information measured by the first and second sensors.

10. The dehumidifying system of claim 1, wherein
    the cooling device is an evaporator of a refrigeration cycle.

11. The dehumidifying system of claim 1, wherein
    the cooling device directly connects the first moisture adsorption/desorption device to the second moisture adsorption/desorption device.

12. A dehumidifying system comprising:
    a main body that includes an inlet port that sucks air from a dehumidification target space and an outlet port that supplies air to the dehumidification target space;

an air passage provided in the main body, the air passage connecting the inlet port and the outlet port;

a first moisture adsorption/desorption device including a first adsorbent in which a first equilibrium-adsorption capacity with respect to air with a relative humidity ranging from 40 to 100% increases in a substantially linear manner with respect to an increase in the relative humidity, the first adsorbent desorbs moisture to air with a low relative humidity, and absorbs moisture from air with a high relative humidity;

a second moisture adsorption/desorption device disposed in the air passage and disposed so as to be spaced apart from the first moisture adsorption/desorption device, the second moisture adsorption/desorption device including a second adsorbent in which a second equilibrium-adsorption capacity with respect to air with a relative humidity ranging from 40 to 100% increases in a substantially linear manner with respect to an increase in the relative humidity, the second adsorbent desorbs moisture to air with a low relative humidity, and absorbs moisture from air with a high relative humidity;

a cooling device disposed between the first moisture adsorption/desorption device and the second moisture adsorption/desorption device, the cooling device cooling air that has been humidified by desorption release of moisture from the first moisture adsorption/desorption device or the second moisture adsorption/desorption device; and switching devices disposed in the air passage, the switching devices switching between a first flow path in which the air sucked from the inlet port passes through the first moisture adsorption/desorption device, the cooling device, and the second moisture adsorption/desorption device in this order, and a second flow path in which the air sucked from the inlet port passes through the second moisture adsorption/desorption device, the cooling device, and the first moisture adsorption/desorption device in this order, wherein the first moisture adsorption/desorption device, the cooling device, and the second moisture adsorption/desorption device are disposed in series in an air flowing direction, the switching devices includes a first switching device and a second switching device, the first switching device is connected to the air inlet port, the second switching device is connected to the air outlet port, and the first flow path and the second flow path pass by the first switching device and the second switching device only once.

13. The dehumidifying system of claim 12, further comprising
a control device configured to control a switching operation of the first switching device and the second switching device to be performed at a predetermined time interval.

14. The dehumidifying system of claim 12, further comprising
a first sensor located between the air inlet and the first switching device, the first sensor measures humidity information of air that has passed through the inlet port;
a second sensor located between the air outlet and the second switching device, the second sensor measures humidity information of air that is to pass through the outlet port; and
a control device that controls a switching operation of the first switching device and the second switching device on a basis of humidity information measured by the first sensor and the second sensor.

15. The dehumidifying system of claim 1, wherein the inlet port comprises a heater-free inlet port.

* * * * *